Patented June 21, 1932

1,863,636

UNITED STATES PATENT OFFICE

GEORGE C. QUELCH, OF OAKMONT, PENNSYLVANIA, ASSIGNOR, BY MESNE ASSIGNMENTS, TO UNION CARBIDE AND CARBON RESEARCH LABORATORIES, INC., OF NEW YORK, N. Y., A CORPORATION OF NEW YORK

GASEOUS FUEL MIXTURE

No Drawing. Application filed June 8, 1926. Serial No. 114,578.

My present invention relates to fuel gases, particularly those suitable for blow-pipe jets or "torches", which are supplied with pure oxygen supplied from a separate source, and which are commonly employed for cutting or welding metals. Customarily, the fuel gas and the oxygen are separately stored and transported in tanks under very high pressure, say 120 atmospheres, or, 1800 pounds per square inch; and for use, the respective tanks are connected to the torch through separate valves whereby each gas is greatly expanded and its pressure reduced to that required for proper blow-pipe operation, say 5 pounds.

Such enormous expansion produces great refrigerating effects, which are much greater for heavier gases than for lighter ones. These effects are not likely to introduce any mechanical difficulties in operation of the valves, where the fuel is pure dry hydrogen, used with pure dry oxygen, both of which are easily attainable by methods long practiced in connection with the well known oxy-hydrogen blow-pipe, the reason being that both hydrogen and oxygen have liquefying and freezing points far below anything that can be reached by expansion from even such great pressures as 120 atmospheres, and hydrogen is phenomenally different from all other gases in that it actually heats up instead of refrigerating when expanded through the above range, without doing work. For the latter reason there seems to be no difficulty even when the hydrogen is diluted with small percentages of other well known fuel gases containing combustible carbon compounds as, for instance, water gas, producer gas and illuminating gas.

As contrasted with the above, an important feature of my present invention is the production of a fuel gas mixture for the above purposes, which is mainly hydrocarbon and therefore of very great calorific or fuel value per cubic foot, as compared with hydrogen. My hydrocarbon gases are so selected and are used with such percentages of hydrogen that no mechanical difficulties are introduced by freezing effects when the gas is expanded for use in the torch. In my preferred fuel gas mixture, the carbon constituent is mainly methane ($CH_4$) diluted with a minor percentage of hydrogen, the higher hydrocarbons, ethane, propane ($C_2H_6$), or the like being eliminated as far as practical, usually less than 2% and preferably substantially less than 1% being pesent in the mixture.

For certain critical values for the diluent, say 45% down to 38% hydrogen, I have found that when used in a blow torch with pure oxygen in the usual way, the flame produced by my fuel gas will cut metal plates 50% faster than the best of the other fuel gas mixtures now on the market. Moreover, the volume of pure oxygen that must be supplied to the torch for a given volume of my gas for perfect combustion is less than six-tenths that required for pure hydrogen, my surplus being available for burning the heated iron. The appearance of the resulting magnetic oxide of iron indicates complete combustion of the metal and none of the oxide tends to cling to the edges of the iron being cut as is common to most fuel gases. Moreover, with my gas it has been found possible to get combustion of the iron without the use of the oxygen jet, which indicates that even under ordinary flame adjustment the gas striking the metal is highly oxidizing.

While my theories explaining the critical percentage desirable for the hydrogen diluent have not been verified, I find that good results are obtainable first, by recognizing the general principle that substantial percentages of hydrogen in the hydrocarbon gases improve ignition and increase the temperature of combustion. In attempting to go beyond this, it will be noted that the improvement in performance as the hydrogen is decreased from 48% down to 38%, would indicate that there should be still further improvement below 38%, but this is not the case with such methane gases as I have been able to obtain. My present theory is, that the desirable minimum percentage of hydrogen depends on the quantities and liquefying points of the small percentages of ethane or other higher hydrocarbons that are contained in the primary gas, above described as being mainly methane. My gaseous mixture consisting mostly of methane and containing 1% or less of ethane preferably contains as diluent not less than 35% to 40% of hydrogen and slightly increasing percentages of ethane seem to require correspondingly increased percentages of hydrogen. Proceeding on this principle, I have found a 44% to 45% hydrogen diluent of the methane affords a reasonably practical factor of safety, taking care of a slight excess of ethane over 1%. The higher percentages of hydrogen make the oxygen consuming or fuel value of the mixture only 4 to 1 as against 5 to 1 for the 38% mixture.

The above interdependence of percentages seems to be due to the fact that in commercial practice, the fuel gases are customarily transported in and used from tanks in which they are stored under enormous pressures; say, 1800 pounds or 120 atmospheres per square inch. When released from such pressures in an expansion valve such as is commonly used for the purpose, results in great latent heat absorption and the refrigerating effect is very great except in the case of hydrogen. Consequently, with some of the heavier gases, that is hydrocarbon gases having boiling points higher than methane, freezing and resulting irregularity of operation of the valves is likely to occur.

Hydrogen, however, differs from all other gases in that instead of cooling it actually heats up when permitted to expand without doing work, at least for all pressures below 3,000 pounds per square inch. Hence, for my pressures, the expanding hydrogen functions as a heater and there should be enough of it in the mixture to keep the refrigerating effects of the other gases within safe limits.

I find that so far as concerns the methane, in practice the ranges and rates of expansion and the resulting temperatures are not sufficient to cause any trouble by partial liquefaction of methane, because its critical temperature is 117° below zero F. though its critical pressure is only 825 pounds.

On the other hand, ethane has the vastly higher critical temperature of 95° above zero while critical pressure is approximately 750 pounds. In practice, it is probable that the ethane can be liquefied and perhaps part of it even solidified by sudden drop from tank pressure of, say, 1800 pounds to the working pressure of, say, 5 pounds. The same tendency exists in the case of other of the higher hydrocarbons of the same series. As countervailing this tendency of the ethane and possibly also as a help with respect to the methane, the pure hydrogen diluent proves entirely effective if used in the above described percentages. While the reason for this may not be altogether clear, any one familiar with the use of pure hydrogen in the oxyhydrogen torch will recognize the fact that there is no refrigerating effect on the reducing valve, even where the hydrogen is expanded in one stage from 1800 pounds pressure to 5 pounds, whereas there is marked refrigerating effect on the reducing valve of the other tank from which the oxygen comes. In this connection, it may be noted that the specific gravity of oxygen is 16 times that of the hydrogen; also there is a similar contrast in the case of the heavy hydrocarbon gases such as ethane, which is 15 times as heavy as hydrogen, and a less contrast in the case of methane which is only 8 times as heavy as hydrogen.

The principle of partial pressures also figures in this connection.

For instance, suppose a typical gaseous mixture in accordance with my invention, comprising methane 60%, ethane 1% and hydrogen 39%. The law of partial pressures indicates that so far as concerns liquefying, the effective pressure on the methane must be reckoned as 60% of the 1800 pounds, that is, 1080, while the pressure on the 1% of ethane will be 1% or less of the 1800, that is, 18 pounds, which is a negligible pressure so far as concerns liquefying. Therefore, the danger to the ethane, is from the refrigerating effect of the 60% methane when expanded from its effective partial pressure of 1080 pounds per square inch. At this point, it is logical, as well as simple and safe, to shift from theory to practice and state my discovery that 38% to 40% of pure hydrogen will prevent 1% of ethane from liquefying notwithstanding the refrigerating effect of the 60% of methane.

The hydrocarbon content and a portion of the hydrogen content of a gas of the above composition may be procured from natural gas by known cracking and separation processes and thereby obtain a dry gaseous mixture containing about 5% hydrogen, 1% ethane and 94% methane with small percentages of higher hydrocarbons. To this mixture sufficient hydrogen may be added to produce a fuel gas of the composition described herein which is adapted to be expanded from 1800 lbs. pressure per sq. inch to 5 lbs. pressure per sq. inch without causing particles of the gas to condense while expanding in one stage from the upper to lower pressure. The irregular and defective operation of the pressure regulator and reducing valve which have been heretofore caused by liquid and frozen particles passing through and adhering to the pressure regulating and reducing valve is thus avoided.

When used for cutting iron, the fuel gas with the amount of oxygen necessary for perfect combustion will be used for the preheating of the metal. This flame is projected or impinged upon the iron to be cut and the temperature of the metal is thereby raised to a point where the metal is rapidly oxidized, that is, burns when a jet of oxygen under pressure is projected against it. The metallic oxide is carried away, or to the bottom of the cut, by the force of the stream of oxygen projected against the heated metal.

The consumption of oxygen therefore will depend, first upon the above described quantity required for complete combustion of the fuel gas to cause preheating, plus the quantity of oxygen required for the complete oxidation of the metal being cut, this latter being directly proportional to the weight of metal oxidized, theoretically, one cubic foot of oxygen for .22 pounds of iron.

It naturally follows that the true basis of comparison of my fuel gases with those of the prior art is quantities required to be used with oxygen for preheating.

Hydrogen may be selected for comparison with my gas, because they seem to represent the two extremes. In general cutting practice it is customary to estimate that equal volumes of hydrogen and oxygen will be used, that is to say, one cylinder of hydrogen will require one cylinder of oxygen. Of this volume approximately 100 cubic feet of oxygen with 200 cubic feet of hydrogen will be used for preheating, the balance of 100 cubic feet of oxygen being used for the actual oxidation of the metal being cut. In comparison with the above, 100 cubic feet of my fuel gas requires only 27.5 cubic feet of oxygen for preheating. Therefore it follows that one tank of my gas is equivalent to over one and four-fifths volumes of hydrogen. I have found in actual practice that 4 to 5 cylinders of oxygen are used for one cylinder of my gas. As one cylinder of my gas would require 55 cubic feet of oxygen for combustion, we can therefore assume that from 745 to 945 cubic feet of oxygen is actually available for the cutting operation.

In this connection, it is to be noted that certain other fuel gas mixtures now on the market seem to retard the actual cutting operation, the iron oxide slag clinging to the under edges of the metal being cut, thus detracting from the appearance of the cut and very materially increasing the time required to perform a given length of cut.

With my fuel gases, the appearance of the magnetic oxide of iron indicates complete combustion of the metal and none of the oxide tends to cling to the edges of the iron being cut as is common with most fuel gases above described, and this result is accomplished with the minimum quantity of oxygen from the cutting jet. Moreover, with my gas it has been found possible to get combustion of the iron without the use of the oxygen jet, which indicates that even under ordinary flame adjustment the gas striking the metal is highly oxidizing.

I claim:

1. A method of producing a highly compressed fuel gas mixture consisting of hydrogen, methane and a small percentage of at least one higher hydrocarbon gas, said mixture being non-condensable upon expanding in one stage from about 1800 pounds per square inch to about 5 pounds per square inch at atmospheric temperatures, from a gas mixture consisting mainly of methane and containing hydrogen and a content of ethane in excess of about 2%, said method comprising mixing said last named mixture with hydrogen until the resulting gas mixture is composed of hydrogen 38% to 45%, methane 53% to 61%, and ethane from slightly less than 1% to 2%, and compressing said resulting gas mixture to about 1800 pounds per square inch in a gas container.

2. As a mixed gas adapted for storage under compression of about 1800 pounds per square inch and for decompression in a single stage from said pressure to a pressure of about 5 pounds per square inch without condensation of any of the constituents of the same, a mixture consisting essentially of hydrogen 38% to 45%, ethane about 1% and methane the remainder.

Signed at Verona, in the county of Allegheny, and State of Pennsylvania, this fifth day of June, A. D. 1926.

GEORGE C. QUELCH.